(12) United States Patent
Nakanishi et al.

(10) Patent No.: US 9,972,832 B2
(45) Date of Patent: May 15, 2018

(54) ACTIVE MATERIAL FOR NONAQUEOUS ELECTROLYTE SECONDARY BATTERY, NEGATIVE ELECTRODE FORM, AND NONAQUEOUS ELECTROLYTE SECONDARY BATTERY

(71) Applicant: SHIN-ETSU CHEMICAL CO., LTD., Tokyo (JP)

(72) Inventors: Tetsuo Nakanishi, Annaka (JP); Kazuyuki Matsumura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 173 days.

(21) Appl. No.: 14/309,122

(22) Filed: Jun. 19, 2014

(65) Prior Publication Data

US 2014/0377647 A1    Dec. 25, 2014

(30) Foreign Application Priority Data

Jun. 20, 2013    (JP) .................................. 2013-129106

(51) Int. Cl.
*H01M 4/13*        (2010.01)
*H01M 4/36*        (2006.01)
(Continued)

(52) U.S. Cl.
CPC ............ *H01M 4/366* (2013.01); *C01B 33/18* (2013.01); *H01M 4/13* (2013.01); *H01M 4/386* (2013.01);
(Continued)

(58) Field of Classification Search
CPC ........ H01M 4/366; H01M 4/13; H01M 4/386; H01M 4/483; H01M 10/0436; H01M 10/052; H01M 10/0525
See application file for complete search history.

(56) References Cited

U.S. PATENT DOCUMENTS 5,556,721 A     9/1996  Sasaki et al.
6,387,565 B1 *  5/2002  Aihara ................ H01M 2/1673
                                                       429/145

(Continued)

FOREIGN PATENT DOCUMENTS

CN      102054983 A     5/2011
JP      2964732 B2      10/1999
(Continued)

OTHER PUBLICATIONS

Kizaki, JP 2011065934 English Translation, published Mar. 31, 2011.*

*Primary Examiner* — Jimmy Vo
(74) *Attorney, Agent, or Firm* — Birch, Stewart, Kolasch & Birch, LLP

(57) ABSTRACT

An active material comprising silica-attached particles in the form of host particles of silicon or silicon compound having spherical silica nano-particles attached to surfaces thereof is suited for use in nonaqueous electrolyte secondary batteries. The spherical silica nano-particles have an average particle size of 5-1000 nm, a particle size distribution $D_{90}/D_{10}$ of up to 3, and an average circularity of 0.8-1. The active material has high fluidity and exhibits improved cycle performance when used in nonaqueous electrolyte secondary batteries.

10 Claims, 3 Drawing Sheets

(51) Int. Cl.
    *H01M 4/38*     (2006.01)
    *H01M 4/48*     (2010.01)
    *C01B 33/18*     (2006.01)
    *H01M 4/02*     (2006.01)

(52) U.S. Cl.
    CPC ......... *H01M 4/483* (2013.01); *C01P 2004/32* (2013.01); *C01P 2004/51* (2013.01); *C01P 2004/62* (2013.01); *C01P 2004/64* (2013.01); *H01M 2004/021* (2013.01)

(56) References Cited

U.S. PATENT DOCUMENTS

| | | | |
|---|---|---|---|
| 6,413,672 B1 | 7/2002 | Suzuki et al. | |
| 6,685,804 B1 | 2/2004 | Ikeda et al. | |
| 6,887,511 B1 | 5/2005 | Shima et al. | |
| 8,722,245 B2 | 5/2014 | Hirose et al. | |
| 2003/0134950 A1* | 7/2003 | Kudo | C08K 9/06 524/262 |
| 2007/0231700 A1* | 10/2007 | Watanabe | H01M 2/145 429/246 |
| 2011/0097627 A1 | 4/2011 | Watanabe et al. | |
| 2014/0315086 A1* | 10/2014 | Put | H01M 4/0416 429/220 |

FOREIGN PATENT DOCUMENTS

| | | |
|---|---|---|
| JP | 2000-173596 A | 6/2000 |
| JP | 3079343 B2 | 8/2000 |
| JP | 3291260 B2 | 6/2002 |
| JP | 2003-109590 A | 4/2003 |
| JP | 2004-185991 A | 7/2004 |
| JP | 2004-303593 A | 10/2004 |
| JP | 3702223 B2 | 10/2005 |
| JP | 3702224 B2 | 10/2005 |
| JP | 2005-317309 A | 11/2005 |
| JP | 2006-338996 A | 12/2006 |
| JP | 4183488 B2 | 11/2008 |
| JP | 2011065934 A * | 3/2011 |
| WO | WO 2013087780 A1 * | 6/2013 ......... H01M 4/0416 |

* cited by examiner

ACTIVE MATERIAL FOR NONAQUEOUS ELECTROLYTE SECONDARY BATTERY, NEGATIVE ELECTRODE FORM, AND NONAQUEOUS ELECTROLYTE SECONDARY BATTERY

CROSS-REFERENCE TO RELATED APPLICATION

This non-provisional application claims priority under 35 U.S.C. § 119(a) on Patent Application No. 2013-129106 filed in Japan on Jun. 20, 2013, the entire contents of which are hereby incorporated by reference.

TECHNICAL FIELD

This invention relates to an active material for use in nonaqueous electrolyte secondary batteries, which has good fluidity and exhibits excellent cycle performance when used in nonaqueous electrolyte secondary batteries, and a negative electrode form and a nonaqueous electrolyte secondary battery using the same.

BACKGROUND ART

In conjunction with the recent rapid advances of portable electronic equipment and communications instruments, nonaqueous electrolyte secondary batteries having a high energy density are strongly demanded from the aspects of cost, size and weight reductions. On the other hand, in the automotive application, active efforts are made on the development of hybrid cars and electric vehicles for the purposes of improving fuel consumption and suppressing the emission of global warming gas.

Silicon is regarded most promising in attaining the battery's goals of size reduction and capacity enhancement since it exhibits an extraordinarily high theoretical capacity of 4,200 mAh/g as compared with the theoretical capacity 372 mAh/g of carbon materials that are currently used in commercial batteries.

For example, JP 2964732 discloses a lithium ion secondary battery using single crystal silicon as a support for negative electrode active material. JP 3079343 discloses a lithium ion secondary battery using a lithium alloy $Li_xSi$ (0≤x≤5) with single crystal, polycrystalline or amorphous silicon. Of these, the lithium alloy $Li_xSi$ with amorphous silicon is preferred, which is prepared by coating crystalline silicon with amorphous silicon resulting from plasma decomposition of monosilane, followed by grinding. Although the amount of a silicon component used is as small as 30 parts as described in Example, the material fails to exhibit cycle stability over several thousands of cycles as achieved by graphite-based materials. Thus the material has never been used in practice.

JP 3702223, 3702224 and 4183488 disclose deposition of an amorphous silicon thin film on an electrode collector by evaporation method, and use of the resulting electrode as a negative electrode. In conjunction with this direct gas phase growth of silicon on the current collector, JP-A 2006-338996 discloses to control the growth direction for suppressing a lowering of cycle performance due to volume expansion. Although this method is successful in improving cycle performance, there are still left problems that the cost is high because the electrode manufacture speed is limited, it is difficult to increase the thickness of silicon thin film, and copper used as the negative electrode collector diffuses into silicon.

Recent approaches taken for this reason include a method for restraining volume expansion by restricting the percent utilization of silicon battery capacity using silicon-containing particles (JP-A 2000-173596, JP 3291260, and JP-A 2005-317309), a method of quenching a silicon melt having alumina added thereto for utilizing grain boundaries in polycrystalline particles as the buffer to volumetric changes (JP-A 2003-109590), polycrystalline particles of mixed phase polycrystals of α- and β-$FeSi_2$ (JP-A 2004-185991), and hot plastic working of a monocrystalline silicon ingot (JP-A 2004-303593).

As discussed above, metallic silicon and silicon alloys having various crystal structures have been proposed to utilize silicon as the active material. They fail to display cycle stability comparable to graphite and require increased costs. That is, a material ensuring economical, large-scale synthesis is not available.

The negative electrode shaped form is prepared by mixing a negative electrode active material, coating to a current collector, drying, pressing and cutting to the desired size. Heretofore, graphite is generally used as the negative electrode active material since it has relatively high fluidity and acceptable dispersibility. As to silicon and silicon compound particles of recent interest, since these particles are strongly adhesive, the powder is not amenable to continuous supply because metering errors often occur when the powder is supplied by a feeder. When an electrode slurry is prepared, the particles are likely to agglomerate. The resulting negative electrode shaped forms tend to be non-uniform.

CITATION LIST

Patent Document 1: JP 2964732
Patent Document 2: JP 3079343
Patent Document 3: JP 3702223
Patent Document 4: JP 3702224
Patent Document 5: JP 4183488
Patent Document 6: JP-A 2006-338996
Patent Document 7: JP-A 2000-173596
Patent Document 8: JP 3291260
Patent Document 9: JP-A 2005-317309
Patent Document 10: JP-A 2003-109590
Patent Document 11: JP-A 2004-185991
Patent Document 12: JP-A 2004-303593

SUMMARY OF INVENTION

An object of the invention is to provide an active material comprising silicon or silicon compound particles, which has high fluidity and exhibits improved cycle performance when used in nonaqueous electrolyte secondary batteries.

The inventors have found that when silicon or silicon compound particles are coated with spherical silica nano-particles to form secondary particles, the resulting secondary particles are unlikely to agglomerate, and this material ensures a stable supply during manufacture of negative electrode shaped forms, minimizes silicon agglomerates in the negative electrode forms, and exhibits improved cycle performance when used in nonaqueous electrolyte secondary batteries.

In one aspect, the invention provides an active material for nonaqueous electrolyte secondary batteries, comprising silica-attached particles consisting of silicon or silicon compound particles and spherical silica nano-particles attached to surfaces thereof, said spherical silica nano-particles having an average particle size of 5 nm to 1.00 µm, a particle size distribution $D_{90}/D_{10}$ of up to 3, and an average circularity of 0.8 to 1.

Preferably, the spherical silica nano-particles are hydrophobic. In a more preferred embodiment, the hydrophobic spherical silica nano-particles are obtained by subjecting a tetrafunctional silane compound, a partial hydrolytic condensate thereof or a combination thereof to hydrolysis and condensation to form hydrophilic spherical silica nano-particles consisting essentially of $SiO_2$ units, and subjecting surfaces of the hydrophilic spherical silica nano-particles to hydrophobic treatment, the hydrophobic treatment including the steps of introducing $R^1SiO_{3/2}$ units wherein $R^1$ is a substituted or unsubstituted monovalent hydrocarbon group of 1 to 20 carbon atoms and then introducing $R^2_3SiO_{1/2}$ units wherein $R^2$ is independently a substituted or unsubstituted monovalent hydrocarbon group of 1 to 6 carbon atoms.

Specifically, the hydrophobic spherical silica nano-particles are obtained through the steps of (A1) forming hydrophilic spherical silica nano-particles, (A2) first hydrophobic surface treatment with trifunctional silane compound, (A3) concentration, and (A4) second hydrophobic surface treatment with monofunctional silane compound, wherein the step (A1) of forming hydrophilic spherical silica nano-particles includes subjecting a tetrafunctional silane compound having the general formula (I):

$$Si(OR^3)_4 \quad (I)$$

wherein $R^3$ is each independently a monovalent hydrocarbon group of 1 to 6 carbon atoms, a partial hydrolyzate thereof or a mixture thereof to hydrolysis and condensation in a mixture of a hydrophilic organic solvent and water in the presence of a basic substance, thereby forming a dispersion of hydrophilic spherical silica nano-particles consisting essentially of $SiO_2$ units in the solvent mixture, the first hydrophobic surface treatment (A2) includes adding a trifunctional silane compound having the general formula (II):

$$R^1Si(OR^4)_3 \quad (II)$$

wherein $R^1$ is a substituted or unsubstituted monovalent hydrocarbon group of 1 to 20 carbon atoms, and $R^4$ is each independently a monovalent hydrocarbon group of 1 to 6 carbon atoms, a partial hydrolyzate thereof or a mixture thereof to the dispersion from step (A1), for conducting surface treatment of the hydrophilic spherical silica nano-particles, thereby obtaining a dispersion of spherical silica nano-particles having $R^1SiO_{3/2}$ units (wherein $R^1$ is as defined above) introduced on their surface in the solvent mixture, the concentration step (A3) includes concentrating the dispersion from step (A2) by removing a portion of the hydrophilic organic solvent and water therefrom, the second hydrophobic surface treatment (A4) includes adding a silazane compound having the general formula (III):

$$R^2_3SiNHSiR^2_3 \quad (III)$$

wherein $R^2$ is each independently a substituted or unsubstituted monovalent hydrocarbon group of 1 to 6 carbon atoms, a monofunctional silane compound having the general formula (IV):

$$R^2_3SiX \quad (IV)$$

wherein $R^2$ is as defined above and X is an OH group or hydrolyzable group, or a mixture thereof to the concentrated dispersion from step (A3), for conducting surface treatment of the spherical silica nano-particles having $R^1SiO_{3/2}$ units introduced thereon, thereby introducing $R^2_3SiO_{1/2}$ units (wherein $R^2$ is as defined above) on their surface.

In another aspect, the invention provides a negative electrode form comprising the active material defined above.

Also contemplated herein is a nonaqueous electrolyte secondary battery comprising the negative electrode form defined above, a positive electrode form, a separator, and a nonaqueous electrolyte.

Advantageous Effect of Invention

The active material comprising silicon or silicon compound particles having silica attached thereto according to the invention has high fluidity and exhibits improved cycle performance when used in nonaqueous electrolyte secondary batteries.

DESCRIPTION OF PREFERRED EMBODIMENTS

Figure 1:
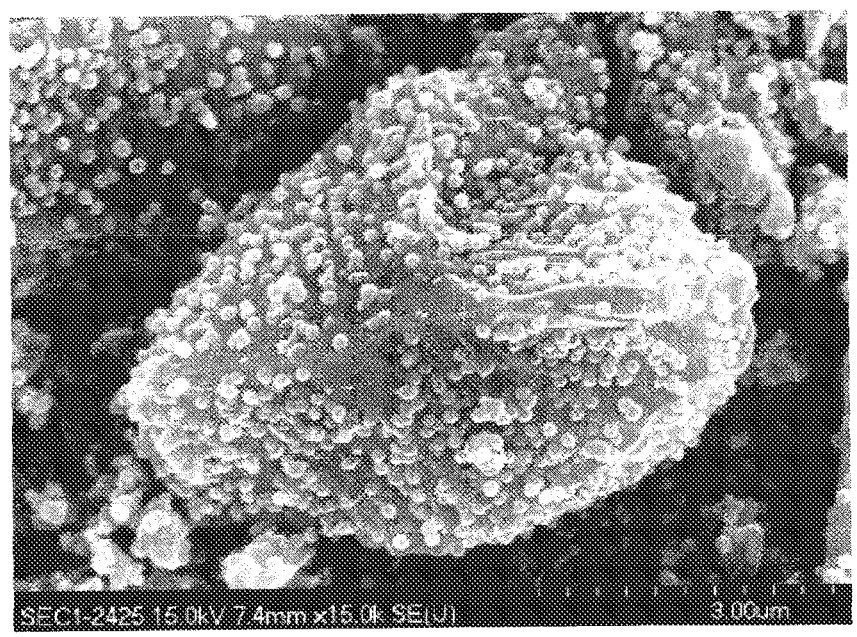
FIG. 1 is a photomicrograph of a silica-attached silicon particle obtained in Example 2.

According to the invention, the active material for nonaqueous electrolyte secondary batteries is defined as comprising silica-attached particles or secondary particles consisting of silicon particles or silicon compound particles and spherical silica nano-particles attached to surfaces thereof. The spherical silica nano-particles have an average particle size of 5 nm to 1.00 µm, a particle size distribution $D_{90}/D_{10}$ of up to 3, and an average circularity of 0.8 to 1.

Silicon or Silicon Compound Particles

The silicon or silicon compound particles serving as host particles may be of one type or in admixture of two or more types. It is noted that often the silicon or silicon compound particles are collectively referred to as "host particles."

The silicon used herein is not particularly limited and may be selected from single crystal silicon, polycrystalline silicon and amorphous silicon. Also useful are high-purity silicon particles (specifically single crystal and polycrystalline silicon particles) having a metal impurity concentration of up to 1 ppm for each, silicon particles of chemical grade which are obtained by washing silicon particles with hydrochloric acid, and treating with hydrofluoric acid and a mixture of hydrofluoric acid and nitric acid to remove metal impurities, and particles obtained by processing metallurgically refined metallic silicon into particles.

The silicon compounds used herein include silicon oxides (e.g., silicon monoxide and silicon dioxide), silicon nitrides, and silicates. Also useful are solid-solution alloys of silicon with a metal such as Al or Ge, and silicides having a metal such as Ti or Co added thereto.

In order that host particles be ready for use as the nonaqueous electrolyte secondary battery active material, the starting silicon or silicon compound is ground to an appropriate particle size. The host particles preferably have a cumulative 50% by volume diameter $D_{50}$ (or average particle size) of 0.01 to 30 microns (µm), more preferably 0.1 to 20 µm, and even more preferably 0.5 to 10 µm. If $D_{50}$ is less than 0.01 µm, the preparation method may be limitative, and problems may arise including an increased cost, too large a specific surface area and too low a negative electrode film density. If $D_{50}$ exceeds 30 μm, such coarse particles may penetrate through the collector when a negative electrode form is pressed. As used herein, the cumulative 50% by volume diameter $D_{50}$ is a particle diameter corresponding to cumulative 50% by volume in the particle size distribution measurement by the laser diffraction scattering method.

Also preferably, the host particles have a BET specific surface area of 0.5 to 20 $m^2/g$, more preferably 1 to 10 $m^2/g$, as measured by the nitrogen adsorption one-point method. If the surface area is less than 0.5 $m^2/g$, the reactivity during preparation of silicon oxide may be low. If the surface area exceeds 20 $m^2/g$, the preparation cost may increase beyond the acceptable level.

Spherical Silica Nano-Particles

The spherical silica nano-particles attaching to surfaces of host particles should have an average particle size of 5 nm to 1.00 μm, preferably 10 to 300 nm, more preferably 30 to 200 nm, and even more preferably 30 to 100 nm. If the particle size is less than 5 nm, a mixture of silicon particles and silicon dioxide particles may agglomerate largely and be difficult to handle. If the particle size exceeds 1.00 μm, such particles may fail to impart good fluidity and packability to the host particles. As used herein, the term "average particle size" of spherical silica nano-particles is a volume basis median diameter in the particle size distribution measurement by the laser diffraction scattering method.

The spherical silica nano-particles should have a $D_{90}/D_{10}$ value of up to 3, preferably up to 2.9, provided that $D_{90}/D_{10}$ is an index of particle size distribution. It is noted that $D_{10}$ designates a particle diameter corresponding to cumulative 10% by volume counting from the smaller side, and $D_{90}$ designates a particle diameter corresponding to cumulative 90% by volume counting from the smaller side, both in the particle size distribution as measured by the laser diffraction scattering method. A $D_{90}/D_{10}$ value of up to 3 indicates a sharp particle size distribution. A sharp particle size distribution makes it easy to control the fluidity of host particles.

As used herein, the term "spherical" includes true spheres and somewhat deformed spheres, and refers to those spheres having an average circularity of 0.8 to 1, preferably 0.92 to 1. The circularity is defined as the circumference of a circle equal to the area of a particle divided by the peripheral length of the particle, which may be determined by analysis of particle images taken under an electron microscope or the like. It is also preferred from the standpoint of imparting good fluidity that the spherical silica nano-particles be primary particles.

Also preferably, the spherical silica nano-particles are hydrophobic. The hydrophobic spherical silica nano-particles are obtained, for example, by effecting hydrolysis and condensation of a tetrafunctional silane compound to form a sol-gel method silica precursor having a submicron particle size, and subjecting it to a specific hydrophobic surface treatment. After the hydrophobic treatment, there are obtained hydrophobic spherical silica nano-particles which have a submicron particle size, i.e., maintain the primary particle size of the silica precursor, are free of agglomerates, and can afford good fluidity.

Preferably, the hydrophobic spherical silica nano-particles are obtained by subjecting a tetrafunctional silane compound, a partial hydrolytic condensate thereof or a combination thereof to hydrolysis and condensation to form hydrophilic spherical silica nano-particles consisting essentially of $SiO_2$ units, and subjecting surfaces of the hydrophilic spherical silica nano-particles to hydrophobic treatment, the hydrophobic treatment including the steps of introducing $R^1SiO_{3/2}$ units wherein $R^1$ is a substituted or unsubstituted monovalent hydrocarbon group of 1 to 20 carbon atoms and then introducing $R^2_3SiO_{1/2}$ units wherein $R^2$ is independently a substituted or unsubstituted monovalent hydrocarbon group of 1 to 6 carbon atoms. The hydrophobic spherical silica nano-particles thus obtained are hydrophobic, amorphous, nearly true spherical, silica nano-particles.

As used herein, the phrase hydrophilic spherical silica nano-particles "consisting essentially of $SiO_2$ units" means that nano-particles are basically composed of $SiO_2$ units and have silanol groups at least on their surface as is well known in the art. This means that sometimes, some of hydrolyzable groups (hydrocarbyloxy groups) on the starting material, tetrafunctional silane compound of the general formula (I) or partial hydrolytic condensate thereof (sometimes collectively referred to as tetrafunctional silane compound) may be left, in minor amounts, on the surface or in the interior of nano-particles, without conversion to silanol groups.

One preferred method (A) for preparing hydrophobic spherical silica nano-particles involves:
step (A1): formation of hydrophilic spherical silica nano-particles,
step (A2): first hydrophobic surface treatment with trifunctional silane compound,
step (A3): concentration, and
step (A4): second hydrophobic surface treatment with monofunctional silane compound.
These steps are described in detail.

The step (A1) of forming hydrophilic spherical silica nano-particles includes subjecting a tetrafunctional silane compound having the general formula (I):

$$Si(OR^3)_4 \quad \quad (I)$$

wherein $R^3$ is each independently a monovalent hydrocarbon group of 1 to 6 carbon atoms, a partial hydrolyzate thereof or a mixture thereof to hydrolysis and condensation in a mixture of a hydrophilic organic solvent and water in the presence of a basic substance, thereby forming a dispersion of hydrophilic spherical silica nano-particles consisting essentially of $SiO_2$ units in the solvent mixture.

In formula (I), $R^3$ is each independently a monovalent hydrocarbon group of 1 to 6 carbon atoms, preferably 1 to 4 carbon atoms, and more preferably 1 to 2 carbon atoms. Exemplary of the monovalent hydrocarbon group are methyl, ethyl, propyl, butyl, and phenyl. Of these, methyl, ethyl, propyl, and butyl are preferred, with methyl and ethyl being most preferred.

Preferred examples of the tetrafunctional silane compound having formula (I) include tetraalkoxysilanes such as tetramethoxysilane, tetraethoxysilane, tetrapropoxysilane, and tetrabutoxysilane, and tetraphenoxysilane. Of these, tetramethoxysilane, tetraethoxysilane, tetrapropoxysilane, and tetrabutoxysilane are preferred, with tetramethoxysilane and tetraethoxysilane being most preferred. Those tetraalkoxysilanes whose alkoxy moiety has a smaller carbon count are preferred for the purpose of obtaining spherical silica nano-particles having a smaller particle size.

Exemplary of the partial hydrolyzate of tetrafunctional silane compound are methyl silicate and ethyl silicate.

The hydrophilic organic solvent is not particularly limited as long as the tetrafunctional silane compound having formula (I), partial hydrolytic condensate thereof and water are soluble or miscible. Suitable solvents include alcohols, cellosolves such as methyl cellosolve, ethyl cellosolve, butyl cellosolve, and cellosolve acetate, ketones such as acetone and methyl ethyl ketone, and ethers such as dioxane and tetrahydrofuran, which may be used alone or in admixture of two or more. Inter alia, the alcohols and cellosolves are preferred, with the alcohols being more preferred.

The alcohols used herein include alcohols having the general formula (V):

$$R^5OH \quad (V)$$

wherein $R^5$ is a monovalent hydrocarbon group of 1 to 6 carbon atoms. In formula (V), $R^5$ is a monovalent hydrocarbon group of 1 to 6 carbon atoms, preferably 1 to 4 carbon atoms, and more preferably 1 to 2 carbon atoms. Typical of the monovalent hydrocarbon group are alkyl groups such as methyl, ethyl, propyl, isopropyl, and butyl. Of these, methyl, ethyl, propyl, and isopropyl are preferred, with methyl and ethyl being most preferred. Examples of the alcohol having formula (V) include methanol, ethanol, propanol, isopropanol and butanol, with methanol and ethanol being preferred. For the reason that the particle size of spherical silica nano-particles increases as the carbon count of alcohol increases, methanol is most preferred for the purpose of obtaining spherical silica nano-particles with a smaller particle size.

In the solvent mixture, water is preferably used in such amounts that 0.5 to 5 moles, more preferably 0.6 to 2 moles, and even more preferably 0.7 to 1 mole of water is present per mole of total hydrocarbyloxy groups on the tetrafunctional silane compound. The hydrophilic organic solvent and water are preferably mixed such that the weight ratio of organic solvent to water may range from 0.5/1 to 10/1, more preferably from 3 to 9, and even more preferably from 5 to 8. As the proportion of hydrophilic organic solvent increases, the particle size of spherical silica nano-particles becomes smaller.

Suitable basic substances include ammonia, dimethylamine, and diethylamine, which may be used alone or in admixture. Inter alia, ammonia and diethylamine are preferred, with ammonia being most preferred. On use, a predetermined amount of the basic substance is dissolved in water to form an aqueous basic solution, which may be mixed with the hydrophilic organic solvent.

An appropriate amount of the basic substance is 0.01 to 2 moles, more preferably 0.02 to 0.5 mole, and even more preferably 0.04 to 0.12 mole per mole of total hydrocarbyloxy groups on the tetrafunctional silane compound. As the amount of the basic substance used is reduced within the range, the particle size of spherical silica nano-particles becomes smaller.

The hydrolysis and condensation of the tetrafunctional silane compound may be carried out by the well-known technique, specifically by adding the tetrafunctional silane compound to a solvent mixture of the hydrophilic organic solvent and water containing the basic substance. For the hydrolytic condensation, a temperature of 5 to 60° C. and a time of 0.5 to 10 hours are preferred. As the temperature becomes higher within the range, the particle size of spherical silica nano-particles becomes smaller.

As a result of hydrolytic condensation, a dispersion of hydrophilic spherical silica nano-particles consisting essentially of $SiO_2$ units in the solvent mixture is obtained. This dispersion (A1) typically has a concentration of 3 to 15% by weight, preferably 5 to 10% by weight.

Step (A2) of first hydrophobic surface treatment with trifunctional silane compound includes adding a trifunctional silane compound having the general formula (II):

$$R^1Si(OR^4)_3 \quad (II)$$

wherein $R^1$ is a substituted or unsubstituted monovalent hydrocarbon group of 1 to 20 carbon atoms, and $R^4$ is each independently a monovalent hydrocarbon group of 1 to 6 carbon atoms, a partial hydrolyzate thereof or a mixture thereof to the dispersion from step (A1), for conducting surface treatment of the hydrophilic spherical silica nano-particles, thereby obtaining a dispersion of spherical silica nano-particles having $R^1SiO_{3/2}$ units (wherein $R^1$ is as defined above) introduced on their surface in the solvent mixture.

This step (A2) is essential to prevent spherical silica nano-particles from agglomerating during the subsequent concentration step (A3). If agglomeration is not restrained, the resulting hydrophobic spherical silica nano-particles fail to maintain the primary particle size and lose the function of imparting fluidity to the host particles.

In formula (II), $R^1$ is a substituted or unsubstituted monovalent hydrocarbon group of 1 to 20 carbon atoms, preferably 1 to 3 carbon atoms, and more preferably 1 to 2 carbon atoms. Exemplary of the monovalent hydrocarbon group $R^1$ are alkyl groups such as methyl, ethyl, n-propyl, isopropyl, butyl, and hexyl. Of these, methyl, ethyl, n-propyl, and isopropyl are preferred, with methyl and ethyl being most preferred. Also included are substituted forms of monovalent hydrocarbon groups in which some or all hydrogen atoms are substituted by halogen atoms such as fluorine, chlorine or bromine, preferably fluorine.

In formula (II), $R^4$ is each independently a monovalent hydrocarbon group of 1 to 6 carbon atoms, preferably 1 to 3 carbon atoms, and more preferably 1 to 2 carbon atoms. Exemplary of the monovalent hydrocarbon group $R^4$ are alkyl groups such as methyl, ethyl, propyl, and butyl. Of these, methyl, ethyl, and propyl are preferred, with methyl and ethyl being most preferred.

Exemplary of the trifunctional silane compound having formula (II) are trialkoxysilanes including methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, trifluoropropyltrimethoxysilane, and heptadecafluorodecyltrimethoxysilane, and partial hydrolyzates thereof, which may be used alone or in admixture. Inter alia, methyltrimethoxysilane, methyltriethoxysilane, ethyltrimethoxysilane, ethyltriethoxysilane, and partial hydrolyzates thereof are preferred, with methyltrimethoxysilane, methyltriethoxysilane, and partial hydrolyzates thereof being most preferred.

An appropriate amount of the trifunctional silane compound having formula (II) added is 0.001 to 1 mole, more preferably 0.01 to 0.1 mole, and even more preferably 0.01 to 0.05 mole per mole of silicon atoms in the hydrophilic spherical silica nano-particles. If the addition amount is less than 0.001 mole, dispersibility may be poor, and the function of imparting fluidity to the host particles become insufficient. An addition amount in excess of 1 mole may allow spherical silica nano-particles to agglomerate together in step (A2).

In step (A2), a trifunctional silane compound having formula (II), a partial hydrolyzate thereof or a mixture thereof (sometimes collectively referred to as trifunctional silane compound) is added to the dispersion from step (A1) for thereby conducting surface treatment of the hydrophilic spherical silica nano-particles. There are obtained spherical silica nano-particles having $R^1SiO_{3/2}$ units (wherein $R^1$ is as defined above) introduced on their surface.

Specifically, the hydrophilic spherical silica nano-particles having $R^1SiO_{3/2}$ units introduced on their surface are dispersed in the solvent mixture. This dispersion (A2) preferably has a concentration of 3% by weight to less than 15% by weight, more preferably 5 to 10% by weight. Outside the range, a lower concentration may lead to a drop of productivity whereas a higher concentration may allow spherical silica nano-particles to agglomerate together in step (A2).

Next, the concentration step (A3) is by removing a portion of the hydrophilic organic solvent and water from the dispersion from step (A2). That is, the dispersion (A2) is concentrated into a concentrated dispersion (A3).

The means of removing a portion of the hydrophilic organic solvent and water may be, for example, distillation or vacuum distillation. The temperature may be selected as appropriate depending on the hydrophilic organic solvent and its proportion, and a temperature of 60 to 110° C. is typically used. To the dispersion (A2), a hydrophobic solvent may be added prior to or during the concentration step. Suitable hydrophobic solvents include hydrocarbon and ketone solvents, which may be used alone or in admixture. Examples include toluene, xylene, methyl ethyl ketone, and methyl isobutyl ketone, with methyl isobutyl ketone being preferred.

The concentrated dispersion (A3) should preferably contain 15 to 40% by weight, more preferably 20 to 35% by weight, and even more preferably 25 to 30% by weight of spherical silica nano-particles. A concentration of at least 15% by weight ensures smooth progress of the subsequent step (A4) whereas a concentration in excess of 40% by weight may cause spherical silica nano-particles to agglomerate together during step (A3).

The concentration step (A3) is essential to prevent a failure in the subsequent step (A4), i.e., the phenomenon that a silazane compound having formula (III), a monofunctional silane compound having formula (IV) or a mixture thereof serving as a surface treating agent can react with the hydrophilic organic solvent and water to make the surface treatment insufficient, allowing the resulting hydrophobic spherical silica nano-particles to agglomerate together in subsequent drying so that the hydrophobic spherical silica nano-particles fail to maintain the primary particle size, thus exacerbating the function of imparting fluidity to the host particles.

The step (A4) of second hydrophobic surface treatment with monofunctional silane compound includes adding a silazane compound having the general formula (III):

$$R^2_3SiNHSiR^2_3 \quad (III)$$

wherein $R^2$ is each independently a substituted or unsubstituted monovalent hydrocarbon group of 1 to 6 carbon atoms, a monofunctional silane compound having the general formula (IV):

$$R^2_3SiX \quad (IV)$$

wherein $R^2$ is as defined above and X is an OH group or hydrolyzable group, or a mixture thereof to the concentrated dispersion from step (A3), for conducting surface treatment of the spherical silica nano-particles having $R^1SiO_{3/2}$ units introduced thereon, thereby introducing $R^2_3SiO_{1/2}$ units (wherein $R^2$ is as defined above) on their surface. The silazane compound and monofunctional silane compound may be used alone or in admixture of two or more.

In formulae (III) and (IV), $R^2$ is each independently a substituted or unsubstituted monovalent hydrocarbon group of 1 to 6 carbon atoms, preferably 1 to 4 carbon atoms, and more preferably 1 to 2 carbon atoms. Exemplary of the monovalent hydrocarbon group $R^2$ are alkyl groups such as methyl, ethyl, propyl, isopropyl, and butyl. Of these, methyl, ethyl, and propyl are preferred, with methyl and ethyl being most preferred. Also included are substituted forms of monovalent hydrocarbon groups in which some or all hydrogen atoms are substituted by halogen atoms such as fluorine, chlorine or bromine, preferably fluorine.

X is a hydroxyl or hydrolyzable group. Exemplary of the hydrolyzable group are chlorine, alkoxy, amino, and acyloxy groups. Inter alia, alkoxy and amino groups are preferred, with the alkoxy groups being more preferred.

Examples of the silazane compound having formula (III) include hexamethyldisilazane and hexaethyldisilazane, with hexamethyldisilazane being preferred.

Examples of the monofunctional silane compound having formula (IV) include monosilanol compounds such as trimethylsilanol and triethylsilanol, monochlorosilanes such as trimethylchlorosilane and triethylchlorosilane, monoalkoxysilanes such as trimethylmethoxysilane and trimethylethoxysilane, monoaminosilanes such as trimethylsilyldimethylamine and trimethylsilyldiethylamine, and monoacyloxysilanes such as trimethylacetoxysilane. Inter alia, trimethylsilanol, trimethylmethoxysilane and trimethylsilyldiethylamine are preferred, with trimethylsilanol and trimethylmethoxysilane being more preferred.

Preferably, the silazane compound and/or monofunctional silane compound is added in an amount of 0.1 to 0.5 mole, more preferably 0.2 to 0.4 mole, and even more preferably 0.25 to 0.35 mole per mole of silicon atoms of the hydrophilic spherical silica nano-particles. If the addition amount is less than 0.1 mole, the resulting nano-particles may be less dispersible and insufficient to exert the effect of imparting fluidity to the host particles. More than 0.5 mole of the compound may be uneconomical.

In step (A4), a silazane compound having formula (III), a monofunctional silane compound having formula (IV), or a mixture thereof is added to the concentrated dispersion from step (A3), whereby the spherical silica nano-particles having $R^1SiO_{3/2}$ units introduced thereon are surface treated with the relevant compound. There are obtained hydrophobic spherical silica nano-particles further having $R^2_3SiO_{1/2}$ units introduced on their surface.

The hydrophobic spherical silica nano-particles are obtained as dispersed in the solvent mixture. The dispersion (A4) preferably has a concentration of 15 to 40% by weight. Upon atmospheric drying or vacuum drying, the hydrophobic spherical silica nano-particles are recovered in powder form.

Silica-Attached Particles

Silica-attached particles consist of host particles (i.e., silicon or silicon compound particles) and spherical silica nano-particles attached to surfaces thereof. As used herein, the term "attached" means the state established when spherical silica nano-particles are added to host particles, that is, the spherical silica nano-particles are physically adsorbed to surfaces of the host particles. Included are the state wherein the spherical silica nano-particles are attached to the surface of the host particles partially or entirely and the state wherein the spherical silica nano-particles cover the surface of the host particles. The silica-attached particles thus obtained take the form of secondary particles.

The amount of spherical silica nano-particles attached or added to host particles is preferably 0.01 to 5.0% by weight, more preferably 0.1 to 3.0% by weight, and even more preferably 0.6 to 3.0% by weight, based on the host particles.

An attachment amount of less than 0.01% by weight may not alter fluidity whereas an amount of up to 5.0% by weight is preferred for cost.

Any well-known blending technique may be used when spherical silica nano-particles are added to host particles. Suitable mixers include Henschel mixers, V-type blenders, ribbon blenders, attritors, kneader/mixers, butterfly mixers, and conventional impeller mixers. Using such a mixer, predetermined amounts of two components are mixed until uniform. By simple mixing, the nano-particles are attached to surfaces of host particles.

The attached state or the formation of secondary particles can be confirmed by observing under an electron microscope. Preferably the silica-attached particles have a cumulative 50% by volume diameter $D_{50}$ (or average particle size) of 0.01 to 30 μm, more preferably 0.1 to 10 μm, and even more preferably 0.5 to 6 μm, as measured for particle size distribution by the laser diffraction scattering method, and a BET specific surface area of 0.1 to 300 $m^2/g$, more preferably 0.5 to 150 $m^2/g$, and even more preferably 1.0 to 100 $m^2/g$, as measured by the nitrogen adsorption one-point method.

Negative Electrode Active Material

According to the invention, the silica-attached particles (secondary particles) thus obtained are used as a negative electrode active material for nonaqueous electrolyte secondary batteries. This is effective for reducing silicon agglomerates in a negative electrode shaped form, whereby nonaqueous electrolyte secondary batteries with improved cycle performance are eventually obtained.

Negative Electrode Material for Nonaqueous Electrolyte Secondary Batteries

In general, a negative electrode material comprises an active material (secondary particles) and a binder. Preferably the secondary particles are compounded in an amount of 3 to 97% by weight, more preferably 4 to 90% by weight based on the total weight (solids) of the negative electrode material. The binder such as polyvinylidene fluoride (PVDF) or styrene-butadiene rubber (SBR) is preferably compounded in an amount of 1 to 20% by weight, more preferably 3 to 10% by weight based on the total weight of the negative electrode material. An amount of the binder within the range minimizes the separation risk of the active material and minimizes the risk of reducing porosity to make an insulating film thicker enough to inhibit migration of Li ions.

The negative electrode material may be diluted with an active material such as graphite to improve conductivity and to provide a volume expansion mitigating effect. Although the battery capacity of the negative electrode material may be reduced by the dilution, the diluted material may provide a high capacity as compared with prior art graphite-based materials. The dilution improves cycle performance over the use of silicon-containing particles alone.

The type of graphite is not particularly limited. Useful are natural graphite, synthetic graphite, various coke powders, meso-phase carbon, vapor phase grown carbon fibers, pitch base carbon fibers, PAN base carbon fibers, and graphite obtained by firing various resins. When used, graphite is preferably compounded in an amount of 2 to 96% by weight, more preferably 60 to 95% by weight based on the total weight of the negative electrode material. An amount of graphite within the range affords a high capacity as compared with prior art graphite-based materials and prevents the negative electrode material from becoming less conductive and increasing its initial resistance.

Negative Electrode Form

The negative electrode material may be shaped into a negative electrode form by the following exemplary procedure. The negative electrode material comprising the active material, graphite, binder and other additives is combined with a solvent suitable for dissolving or dispersing the binder, such as N-methylpyrrolidone or water, and kneaded into a paste mix, which is applied in sheet form to a current collector. The current collector may be copper foil, nickel foil or any other materials which are typically used as the negative electrode current collector while its thickness and surface treatment are not critical. The method of shaping the mix into a sheet is not particularly limited and any well-known methods may be used.

Nonaqueous Electrolyte Secondary Battery

Using the negative electrode form thus shaped, a nonaqueous electrolyte secondary battery, especially lithium ion secondary battery can be fabricated. The nonaqueous electrolyte secondary battery thus constructed is characterized by the use of the negative electrode form while the positive electrode form, separator, nonaqueous electrolyte, electrolyte solution, and cell design are not critical. For example, the positive electrode active material used herein may be selected from transition metal oxides such as $LiCoO_2$, $LiNiO_2$, $LiMn_2O_4$, $V_2O_5$, $MnO_2$, $TiS_2$ and $MoS_2$, lithium, and chalcogen compounds. The nonaqueous electrolytes used herein may be lithium salts such as lithium hexafluorophosphate and lithium perchlorate. Examples of the nonaqueous solvent for the electrolyte solution include propylene carbonate, ethylene carbonate, diethyl carbonate, dimethoxyethane, γ-butyrolactone and 2-methyltetrahydrofuran, alone or in admixture. Use may also be made of other various nonaqueous electrolytes and solid electrolytes.

The shape of the nonaqueous electrolyte secondary battery is arbitrary and not particularly limited. In general, coin type batteries using a stack of electrodes and separator punched in coin form, and rectangular and cylindrical batteries obtained by spirally winding electrode sheets and separator are used.

EXAMPLE

Examples of the invention are given below by way of illustration and not by way of limitation.

[Synthesis of Hydrophobic Spherical Silica Nano-Particles]

Synthesis Example 1

Step (A1): Formation of Hydrophilic Spherical Silica Nano-Particles

A 3-liter glass reactor equipped with a stirrer, dropping funnel and thermometer was charged with 989.5 g (to give a weight ratio of methanol to water of 5.4) of methanol, 135.5 g (3.6 moles per mole of tetramethoxysilane) of water, and 66.5 g (0.38 mole of ammonia per mole of tetramethoxysilane) of 28 wt % aqueous ammonia, which were mixed. To the solution which was adjusted at 35° C., with stirring, 436.5 g (2.87 moles) of tetramethoxysilane was added dropwise over 6 hours. After the completion of dropwise addition, stirring was continued for a further 0.5 hour to conduct hydrolysis, yielding a suspension of hydrophilic spherical silica nano-particles.

Step (A2): First Hydrophobic Surface Treatment

To the suspension, 4.4 g (0.03 mole, to give a molar ratio to silicon atoms of hydrophilic spherical silica nano-particles of 0.01) of methyltrimethoxysilane was added dropwise over 0.5 hour. After the completion of dropwise addition, stirring was continued for a further 12 hours to conduct hydrophobic treatment on surfaces of silica nano-particles, yielding a dispersion of hydrophobic spherical silica nano-particles. The concentration of hydrophobic spherical silica nano-particles in the dispersion was 11% by weight.

Step (A3): Concentration

The glass reactor was equipped with an ester adaptor and condenser tube. The dispersion from step (A2) was heated at 60-70° C., whereby methanol and water were distilled off in a total amount of 1,021 g, yielding a concentrated dispersion of hydrophobic spherical silica nano-particles in the solvent mixture. The concentration of hydrophobic spherical silica nano-particles in the concentrated dispersion was 28% by weight.

Step (A4): Second Hydrophobic Surface Treatment

To the concentrated dispersion from step (A3) at room temperature, 138.4 g (0.86 mole, to give a molar ratio to silicon atoms of hydrophilic spherical silica nano-particles of 0.3) of hexamethyldisilazane was added. The dispersion was heated at 50-60° C. for 9 hours for reaction, that is, trimethylsilylating reaction on silica nano-particles in the dispersion. From the dispersion, the solvents were distilled off at 130° C. under a vacuum of 6,650 Pa, yielding 186 g of hydrophobic spherical silica nano-particles (1).

The hydrophilic spherical silica nano-particles from step (A1) were analyzed by Measurement Method 1 as described below. The hydrophobic spherical silica nano-particles obtained through steps (A1) to (A4) were analyzed by Measurement Methods 2 and 3 as described below. The results are shown in Table 1.

[Analysis of Silica Nano-Particles]
1. Measurement of Average Particle Size of Hydrophilic Spherical Silica Nano-Particles Obtained from Step (A1)

The silica nano-particle suspension was added to methanol so as to give a concentration of 0.5% by weight of silica nano-particles. The suspension was ultrasonified for 10 minutes for dispersing the nano-particles. The particle size distribution of thus dispersed nano-particles was measured by a Nanotrac particle size distribution analyzer by the dynamic light scattering/laser Doppler method (trade name UPA-EX150 by Nikkiso Co., Ltd.). The median diameter on volume basis is reported as the average particle size. The median diameter is a particle diameter at cumulative 50% by volume when the particle size distribution is expressed as cumulative distribution.

2. Measurement of Average Particle Size and Particle Size Distribution $D_{90}/D_{10}$ of Hydrophobic Spherical Silica Nano-Particles Obtained from Step (A4)

The silica nano-particles were added to methanol so as to give a concentration of 0.5% by weight of silica nano-particles. This was ultrasonified for 10 minutes for dispersing the nano-particles. The particle size distribution of thus dispersed nano-particles was measured by a Nanotrac particle size distribution analyzer by the dynamic light scattering/laser Doppler method (trade name UPA-EX150 by Nikkiso Co., Ltd.). The median diameter on volume basis is reported as the average particle size.

The particle size distribution $D_{90}/D_{10}$ was determined from measurements of $D_{10}$ and $D_{90}$ wherein $D_{10}$ and $D_{90}$ correspond to a particle diameter at cumulative 10% and 90% by volume counting from the smaller side in the particle size distribution measurement, respectively.

3. Measurement of Shape of Hydrophobic Spherical Silica Nano-Particles

Sample particles were observed under an electron microscope S-4700 (Hitachi, Ltd., magnifying power×$10^5$) for inspecting their shape. Not only true spheres, but also somewhat deformed spheres are included in the "spherical" particles. The particle shape was evaluated in terms of circularity when a particle is projected as a two-dimensional image. Particles are regarded as "spherical" when they have a circularity in the range of 0.8 to 1. The circularity is defined as the circumference of a circle equal to the area of a particle divided by the peripheral length of the particle.

Synthesis Example 2

The procedure of Synthesis Example 1 was repeated except that 1045.7 g of methanol, 112.6 g of water, and 33.2 g of 28 wt % aqueous ammonia were used in step (A1). There was obtained 188 g of hydrophobic spherical silica nano-particles (2). The silica nano-particles (2) were analyzed as in Synthesis Example 1, with the results shown in Table 1.

Synthesis Example 3

Step (A1): Formation of Hydrophilic Spherical Silica Nano-Particles

A 3-liter glass reactor equipped with a stirrer, dropping funnel and thermometer was charged with 623.7 g of methanol, 41.4 g of water, and 49.8 g of 28 wt % aqueous ammonia, which were mixed. To the solution which was adjusted at 35° C., with stirring, 1,163.7 g of tetramethoxysilane and 418.1 g of 5.4 wt % aqueous ammonia were concurrently added dropwise over 6 hours and 4 hours, respectively. After the completion of dropwise addition of tetramethoxysilane, stirring was continued for a further 0.5 hour to conduct hydrolysis, yielding a suspension of silica nano-particles.

Step (A2): First Hydrophobic Surface Treatment

To the suspension at room temperature, 11.6 g (to give a molar ratio of methyltrimethoxysilane to tetramethoxysilane of 0.01) of methyltrimethoxysilane was added dropwise over 0.5 hour. After the completion of dropwise addition, stirring was continued for a further 12 hours to conduct hydrophobic treatment on surfaces of silica nano-particles.

Step (A3): Concentration

The glass reactor was equipped with an ester adaptor and condenser tube. To the dispersion of surface treated silica nano-particles from step (A2), 1,440 g of methyl isobutyl ketone was added. The dispersion was heated at 80 to 110° C. for 7 hours, whereby methanol and water were distilled off.

Step (A4): Second Hydrophobic Surface Treatment

To the concentrated dispersion from step (A3) at room temperature, 357.6 g of hexamethyldisilazane was added. The dispersion was heated at 120° C. for 3 hours for reaction, that is, trimethylsilylating reaction on silica nano-particles. From the dispersion, the solvents were distilled off under vacuum, yielding 472 g of hydrophobic spherical silica nano-particles (3). The silica nano-particles (3) were analyzed as in Synthesis Example 1, with the results shown in Table 1.

Synthesis Example 4

The procedure of Synthesis Example 3 was repeated except that the temperature for hydrolysis of tetramethoxysilane was changed from 35° C. to 20° C. during the synthesis of silica nano-particles. There was obtained 469 g of hydrophobic spherical silica nano-particles (4). The silica nano-particles (4) were analyzed as in Synthesis Example 1, with the results shown in Table 1.

Synthesis Example 5

A 0.3-liter glass reactor equipped with a stirrer and thermometer was charged with 100 g of VMC silica (trade name SOC1 by Admatechs Co., Ltd., VMC: vaporized metal combustion). With stirring, 1 g of deionized water was added. With the reactor closed, stirring was continued at 60° C. for 10 hours. The reactor was cooled to room temperature, after which with stirring, 2 g of hexamethyldisilazane was added. With the reactor closed, stirring was continued for a further 24 hours. The reactor was heated at 120° C., whereupon the residual reactant and ammonia formed were removed while feeding nitrogen gas. There was obtained 100 g of hydrophobic spherical silica nano-particles (5). The silica nano-particles (5) were analyzed as in Synthesis Example 1, with the results shown in Table 1.

Synthesis Example 6

A 0.3-liter glass reactor equipped with a stirrer and thermometer was charged with 100 g of VMC silica (trade name SOC1 by Admatechs Co., Ltd.). With stirring, 1 g of deionized water was added. With the reactor closed, stirring was continued at 60° C. for 10 hours. The reactor was cooled to room temperature, after which with stirring, 1 g of methyltrimethoxysilane was added. With the reactor closed, stirring was continued for a further 24 hours. With stirring, 2 g of hexamethyldisilazane was added. With the reactor closed, stirring was continued for a further 24 hours. The reactor was heated at 120° C., whereupon the residual reactants and ammonia formed were removed while feeding nitrogen gas. There was obtained 101 g of hydrophobic irregular silica nano-particles (6). The silica nano-particles (6) were analyzed as in Synthesis Example 1, with the results shown in Table 1.

Examples 1 to 5 and Comparative Examples 1 to 4

The silica nano-particles obtained in each Synthesis Examples was added to host particles of polycrystalline silicon having an average particle size of 5.1 μm in an amount as shown in Table 2. In a sample mill, the particles were milled for 3 minutes, yielding secondary particles in the form of host silicon particles having silica nano-particles attached to surfaces thereof. The particles were examined by the following tests.

Comparative Example 5

Primary particles of polycrystalline silicon having an average particle size of 5.1 μm were similarly examined.

Figure 2:
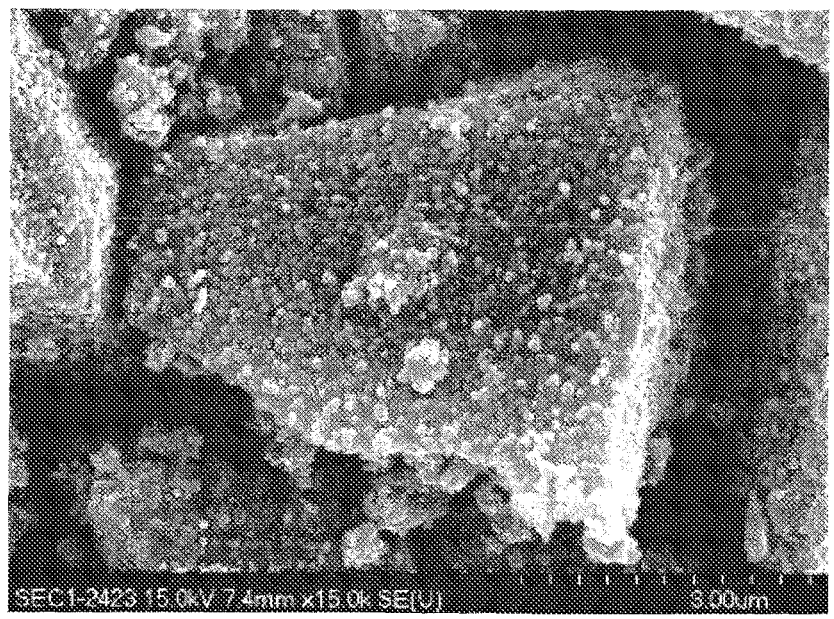
FIG. 2 is a photomicrograph of a silica-attached silicon particle obtained in Example 4.
Figure 3:
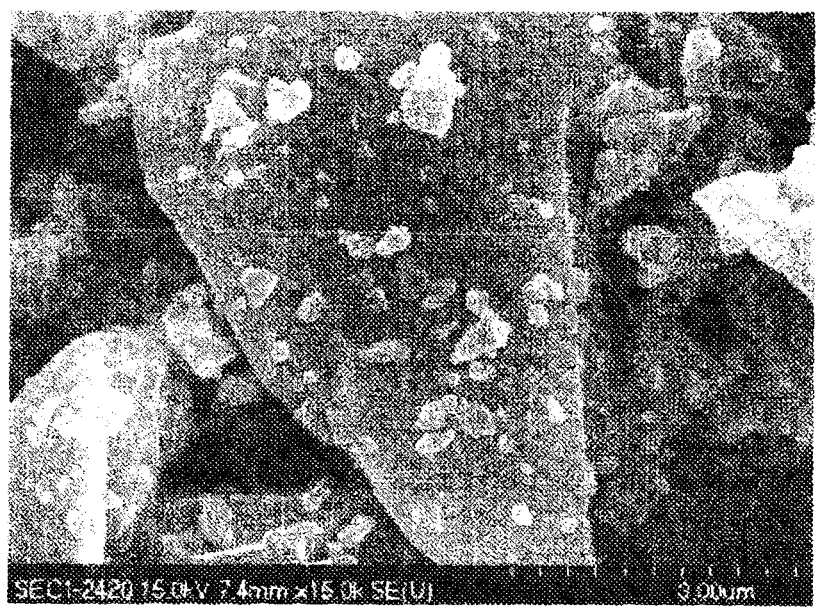
FIG. 3 is a photomicrograph of a silicon particle obtained in Comparative Example 5.

FIGS. 1 to 3 are photomicrographs. FIGS. 1 and 2 show a silica-attached particle in the form of a silicon particle having hydrophobic spherical silica nano-particles attached to the surface thereof, in Examples 2 and 4, respectively. FIG. 3 shows primary silicon particles to which no hydrophobic spherical silica nano-particles are added, in Comparative Example 5.

The silica-attached particles in Examples and Comparative Examples were measured and evaluated by the following tests.

[Measurement of Silica-Attached Particles]
1. Average Particle Size $D_{50}$

Measurement of particle size distribution by the laser diffraction scattering method was carried out. Specifically, using Microtrac MT330 (Nikkiso Co., Ltd.), a particle diameter $D_{50}$ at cumulative 50% by volume was measured.

2. BET Specific Surface Area

Using analyzer Macsorb® HM model 1201 (Mountech Co., Ltd.), a BET specific surface area was measured according to the nitrogen adsorption one-point method.

The hydrophobic spherical silica nano-particles obtained in each Synthesis Examples was added to host particles as shown in Table 2. In a sample mill, the contents were milled for 3 minutes. During the milling step, basic flow energy (BFE) was measured as an index of powder rheology of silicon particle composition. The detail is described below.

[Evaluation of Silica-Attached Particles]
Flow

Basic flow energy (BFE) as an index of powder rheology was measured using a powder rheometer system FT4 (Sysmex Corp.). The measurement principle of this system is described below. The system includes a vertically standing cylindrical vessel and a vertical shaft fitted with a pair of rotary blades at its distal end. The vessel is loaded with a

TABLE 1

|  |  | Synthesis Example | | | | | |
|---|---|---|---|---|---|---|---|
|  |  | 1 | 2 | 3 | 4 | 5 | 6 |
| Silica nano-particles |  | (1) | (2) | (3) | (4) | (5) | (6) |
| (A1) | Average particle size [1] (nm) | 52 | 11 | 115 | 230 | — | — |
| (A4) | Average particle size [2] (nm) | 52 | 11 | 115 | 238 | 300 | 300 |
|  | Particle size distribution $D_{90}/D_{10}$ | 2.21 | 2.40 | 2.23 | 2.80 | 5.40 | 4.80 |
|  | Shape | spherical | spherical | spherical | spherical | spherical | irregular |
|  | Circularity | 0.86 | 0.92 | 0.90 | 0.81 | 0.80 | 0.65 |

[1] average particle size of hydrophilic spherical silica nano-particles from step (A1)
[2] average particle size of final silica nano-particles powder sample. The shaft is moved down through the powder over a certain distance from height H1 to H2 while rotating the blades. For measurement, the force reacted by the powder is divided into torque and load components. The respective work quantities (energy) associated with downward motion of the blades from H1 to H2 are determined, from which the total energy is calculated. The smaller the total energy thus measured, the better is the fluidity of the powder. Thus the total energy is used as an index of powder rheology. A stability test was also carried out by the same system.

Vessel: cylindrical glass vessel having a volume of 160 mL (inner diameter 50 mm, length 79 mm)

Blades: a pair of horizontally opposed blades fitted at the distal end of a stainless steel shaft which is vertically inserted into the cylindrical vessel at the center. The blades define a diameter of 48 mm. The distance between H1 and H2 is 69 mm.

Stability Test

Powder rheology properties are observed when the powder loaded in the vessel in a stationary state is fluidized. The blade is rotated at a rotational speed of 100 mm/sec at the tip. The total energy is consecutively measured 7 times. The seventh total energy, which is referred to as basic flow energy (BFE) because of the most stable state, is shown in Table 2. A smaller value indicates a high fluidity.

Flow Velocity Change Test

Following the stability test, the total energy is measured while the blade rotational speed is changed from 100 mm/sec to 70 mm/sec to 40 mm/sec to 10 mm/sec. A flow rate index (FRI) closer to 1 indicates more stability to flow speed. FRI is a value at 10 mm/sec divided by a value at 100 mm/sec.

TABLE 2

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Silica nano-particles | (1) | (1) | (2) | (3) | (4) | (5) | (5) | (6) | (6) | — |
| Amount of silica added (wt % based on host particles) | 0.5 | 3 | 3 | 3 | 3 | 0.5 | 3 | 0.5 | 3 | 0 |
| Average particle size (μm) | 5.2 | 5.2 | 5.2 | 5.2 | 5.2 | 5.2 | 5.2 | 5.2 | 5.2 | 5.1 |
| BFE (mJ) | 190 | 170 | 175 | 380 | 400 | 550 | 545 | 570 | 560 | 700 |
| FRI | 1.8 | 1.7 | 2.0 | 2.0 | 2.0 | 2.0 | 2.5 | 2.6 | 2.6 | 2.7 |

Examples 6 to 10 and Comparative Examples 6 to 9

The silica nano-particles obtained in each Synthesis Examples was added to host particles of silicon oxide having an average particle size of 3.2 μm in an amount as shown in Table 3. In a sample mill, the contents were milled for 3 minutes, yielding secondary particles in the form of host particles of silicon oxide having silica nano-particles attached to surfaces thereof. The secondary particles were measured to have an average particle size of 3.4 μm and evaluated as above.

Comparative Example 10

Primary particles of silicon oxide having an average particle size of 3.2 μm were similarly evaluated.

TABLE 3

|  | Example | | | | | Comparative Example | | | | |
| --- | --- | --- | --- | --- | --- | --- | --- | --- | --- | --- |
|  | 6 | 7 | 8 | 9 | 10 | 6 | 7 | 8 | 9 | 10 |
| Silica nano-particles | (1) | (1) | (2) | (3) | (4) | (5) | (5) | (6) | (6) | — |
| Amount of silica added (wt % based on host particles) | 0.5 | 3 | 3 | 3 | 3 | 0.5 | 3 | 0.5 | 3 | 0 |
| Average particle size (μm) | 3.4 | 3.4 | 3.4 | 3.4 | 3.4 | 3.4 | 3.4 | 3.4 | 3.4 | 3.2 |
| BFE (mJ) | 160 | 150 | 155 | 330 | 350 | 470 | 465 | 480 | 475 | 600 |
| FRI | 1.7 | 1.7 | 2.0 | 2.0 | 2.0 | 2.0 | 2.4 | 2.5 | 2.5 | 2.7 |

It is evident that silica-attached particles within the scope of the invention are improved in fluidity, while silica-attached particles outside the scope of the invention and neat host particles are inferior in fluidity as demonstrated by high values of BFE and FRI.

Evaluation of Battery Properties

A battery test was carried out for evaluating the silica-attached particles in Examples and Comparative Examples whether they were effective as negative electrode active material.

A mix was prepared by mixing 15% by weight of the particles obtained above Examples and Comparative Examples with 79.5% by weight of synthetic graphite (average particle size $D_{50}$=10 μm) as conductive agent and 1.5% by weight of carboxymethyl cellulose (CMC). To the mix were added 2.5% by weight as solids of a water dispersion of acetylene black (solids concentration 17.5 wt %) and 1.5% by weight as solids of a water dispersion of styrene-butadiene rubber (SBR) (solids concentration 40 wt %). The mix was diluted with deionized water into a slurry.

The slurry was coated onto a copper foil of 10 μm thick by means of a doctor blade having a gap of 150 μm, pre-dried, and pressed by a roller press at 60° C. into a negative electrode sheet, which was dried at 160° C. for 2 hours. Finally, pieces of 2 cm² were punched out of the sheet and used as negative electrode form.

Using the negative electrode form, two lithium ion secondary cell samples were fabricated. The counter electrode was a lithium foil. The nonaqueous electrolyte was a non-aqueous electrolyte solution of lithium bis(trifluoromethanesulfonyl)imide in a 1/1 (by volume) mixture of ethylene carbonate and diethyl carbonate in a concentration of 1 mol/liter. The separator was a porous polyethylene film of 30 μm thick.

The cell was tested by means of a secondary cell charge/discharge tester (Nagano K.K.). Charging was conducted with a constant current flow of 0.15 c until the voltage of the test cell reached 0 V, and after reaching 0 V, continued with a reduced current flow so that the cell voltage was kept at 0 V, and terminated when the current flow decreased below 0.02 c. A charge capacity was determined. Note that "c" is a current value needed until the theoretical capacity is charged within 1 hour.

Evaluation of Cycle Performance

To evaluate the cycle performance of the negative electrode form shaped using the negative electrode active material (Examples 1 to 10 and Comparative Examples 1 to 10), a coin-type lithium ion secondary cell was fabricated. The positive electrode form was a single layer sheet using $LiCoO_2$ as the active material and an aluminum foil as the current collector. The nonaqueous electrolyte was a non-aqueous electrolyte solution of lithium hexafluorophosphate in a 1/1 (by volume) mixture of ethylene carbonate and diethyl carbonate in a concentration of 1 mol/liter. The separator was a porous polyethylene film of 30 μm thick.

The cell was aged two nights at room temperature before it was tested by means of a secondary cell charge/discharge tester (Nagano K.K.). Charging was conducted with a constant current flow of 1.2 mA (0.25 c vs. positive electrode) until the voltage of the test cell reached 4.2 V, and after reaching 4.2 V, continued with a reduced current flow so that the cell voltage was kept at 4.2 V, and terminated when the current flow decreased below 0.3 mA. Discharging was conducted with a constant current flow of 0.6 mA and terminated when the cell voltage reached 3.0 V. A discharge capacity was determined.

The charge/discharge operation was repeated 300 cycles. A ratio of discharge capacity after 100 cycles and 300 cycles relative to discharge capacity at the 5-th cycle was calculated, with the results shown in Tables 4 and 5.

TABLE 4

| | | Charge capacity, mAh/g (counter electrode: Li) | Capacity retention, % | |
|---|---|---|---|---|
| | | | 100 cycles | 300 cycles |
| Example | 1 | 740 | 97 | 93 |
| | 2 | 738 | 99 | 96 |
| | 3 | 732 | 98 | 96 |
| | 4 | 733 | 96 | 95 |
| | 5 | 730 | 96 | 94 |
| Comparative Example | 1 | 739 | 93 | 81 |
| | 2 | 730 | 94 | 84 |
| | 3 | 736 | 92 | 77 |
| | 4 | 728 | 93 | 76 |
| | 5 | 742 | 93 | 78 |

As seen from the charge/discharge capacity data relative to Li counter electrode in Table 4, the negative electrode materials of Examples 1 to 5 and Comparative Examples 1 to 5 have a high charge capacity as compared with the charge capacity per unit weight of graphite. In the cycle performance test at a high charge/discharge rate, a difference is recognized between Examples 1 to 5 and Comparative Examples 1 to 5, indicating that the negative electrode materials using silica-attached particles within the scope of the invention are superior.

TABLE 5

| | | Charge capacity, mAh/g (counter electrode: Li) | Capacity retention, % | |
|---|---|---|---|---|
| | | | 100 cycles | 300 cycles |
| Example | 6 | 524 | 98 | 97 |
| | 7 | 510 | 99 | 98 |
| | 8 | 508 | 97 | 95 |
| | 9 | 503 | 97 | 94 |
| | 10 | 505 | 96 | 95 |
| Comparative Example | 6 | 520 | 95 | 75 |
| | 7 | 498 | 96 | 73 |
| | 8 | 510 | 93 | 74 |
| | 9 | 488 | 94 | 73 |
| | 10 | 520 | 94 | 72 |

As seen from Table 5, the negative electrode materials of Examples 6 to 10 have a high charge capacity as compared with the charge capacity per unit weight of graphite. In the cycle performance test, Examples 6 to 10 are better than Comparative Examples 6 to 10, indicating effective long-term cycle performance.

Also, the present invention is not to be considered limited to the above embodiments. The above embodiments are exemplification; what has the substantially same structure as technical idea indicated to the claim of the present invention, and same effect, it is included in the technical scope of the present invention.

Japanese Patent Application No. 2013-129106 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An active material for nonaqueous electrolyte secondary batteries, comprising
silica-attached particles consisting of silicon or silicon compound particles and hydrophobic spherical silica nano-particles attached to surfaces of said silicon or silicon compound particles, wherein said hydrophobic spherical silica nano-particles are obtained by subjecting a tetrafunctional silane compound, a partial hydrolytic condensate thereof or a combination thereof to hydrolysis and condensation to form hydrophilic spherical silica nano-particles consisting essentially of $SiO_2$ units, and subjecting surfaces of the hydrophilic spherical silica nano-particles to hydrophobic treatment, the hydrophobic treatment including steps of introducing $R^1SiO_{3/2}$ units wherein $R^1$ is a substituted or unsubstituted monovalent hydrocarbon group of 1 to 20 carbon atoms and then introducing $R^2{}_3SiO_{1/2}$ units wherein $R^2$ is independently a substituted or unsubstituted monovalent hydrocarbon group of 1 to 6 carbon atoms,
wherein said silica-attached particles are a mixture of said silicon or silicon compound particles and said hydrophobic spherical silica nano-particles, and said hydrophobic spherical silica nano-particles have an average particle size of 5 nm to 1.00 μm, a particle size distribution $D_{90}/D_{10}$ of up to 3, and an average circularity of 0.8 to 1, and
wherein said silicon or silicon compound particles have a cumulative 50% by volume diameter $D_{50}$ of 3.2 to 30 μm.

2. The active material of claim 1, wherein said hydrophobic spherical silica nano-particles are obtained through steps of (A1) forming hydrophilic spherical silica nano-particles, (A2) first hydrophobic surface treatment with trifunctional silane compound, (A3) concentration, and (A4) second hydrophobic surface treatment with monofunctional silane compound, wherein
the step (A1) of forming hydrophilic spherical silica nano-particles includes subjecting a tetrafunctional silane compound of general formula (I):

wherein $R^3$ is each independently a monovalent hydrocarbon group of 1 to 6 carbon atoms, a partial hydrolyzate thereof or a mixture thereof to hydrolysis and condensation in a mixture of a hydrophilic organic solvent and water in a presence of a basic substance, thereby forming a dispersion of hydrophilic spherical silica nano-particles consisting essentially of $SiO_2$ units in the solvent mixture,
the first hydrophobic surface treatment (A2) includes adding a trifunctional silane compound of general formula (II):

wherein $R^1$ is a substituted or unsubstituted monovalent hydrocarbon group of 1 to 20 carbon atoms, and $R^4$ is each independently a monovalent hydrocarbon group of 1 to 6 carbon atoms, a partial hydrolyzate thereof or a mixture thereof to the dispersion from step (A1), for conducting surface treatment of the hydrophilic spherical silica nano-particles, thereby obtaining a dispersion of spherical silica nano-particles having $R^1SiO_{3/2}$ units (wherein $R^1$ is as defined above) introduced on their surface in the solvent mixture,
the concentration step (A3) includes concentrating the dispersion from step (A2) by removing a portion of the hydrophilic organic solvent and water therefrom,
the second hydrophobic surface treatment (A4) includes adding a silazane compound of general formula (III):

wherein $R^2$ is each independently a substituted or unsubstituted monovalent hydrocarbon group of 1 to 6 carbon atoms, a monofunctional silane compound of general formula (IV):

wherein $R^2$ is as defined above and X is an OH group or hydrolyzable group, or a mixture thereof to the concentrated dispersion from step (A3), for conducting surface treatment of the surface-treated hydrophilic spherical silica nano-particles having $R^1SiO_{3/2}$ units introduced thereon, thereby introducing $R^2{}_3SiO_{1/2}$ units (wherein $R^2$ is as defined above) on their surface.

3. The active material for nonaqueous electrolyte secondary batteries of claim 1, wherein the silica-attached particles are secondary particles.

4. The active material for nonaqueous electrolyte secondary batteries of claim 1, wherein the silica-attached particles have a cumulative 50% by volume diameter $D_{50}$ of 3.4 to 30 μm.

5. The active material for nonaqueous electrolyte secondary batteries of claim 1, wherein the silica-attached particles have a BET specific surface area of 0.1 to 300 $m^2/g$.

6. The active material for nonaqueous electrolyte secondary batteries of claim 1, wherein said silicon or silicon compound particles are polycrystalline silica particles or silicon oxide particles.

7. The active material for nonaqueous electrolyte secondary batteries of claim 6, wherein the hydrophobic spherical silica nano-particles have an average particle size of 11-238 nm, a particle size distribution $D_{90}/D_{10}$ of 2.21-2.80, and an average circularity of 0.81-0.92.

8. The active material for nonaqueous electrolyte secondary batteries of claim 1, wherein the amount of said silica nano-particles joined to said silicon or silicon compound particles is 0.1 to 3.0% by weight.

9. A negative electrode foam comprising the active material of claim 1.

10. A nonaqueous electrolyte secondary battery comprising the negative electrode form of claim 9, a positive electrode form, a separator, and a nonaqueous electrolyte.